Patented July 12, 1932

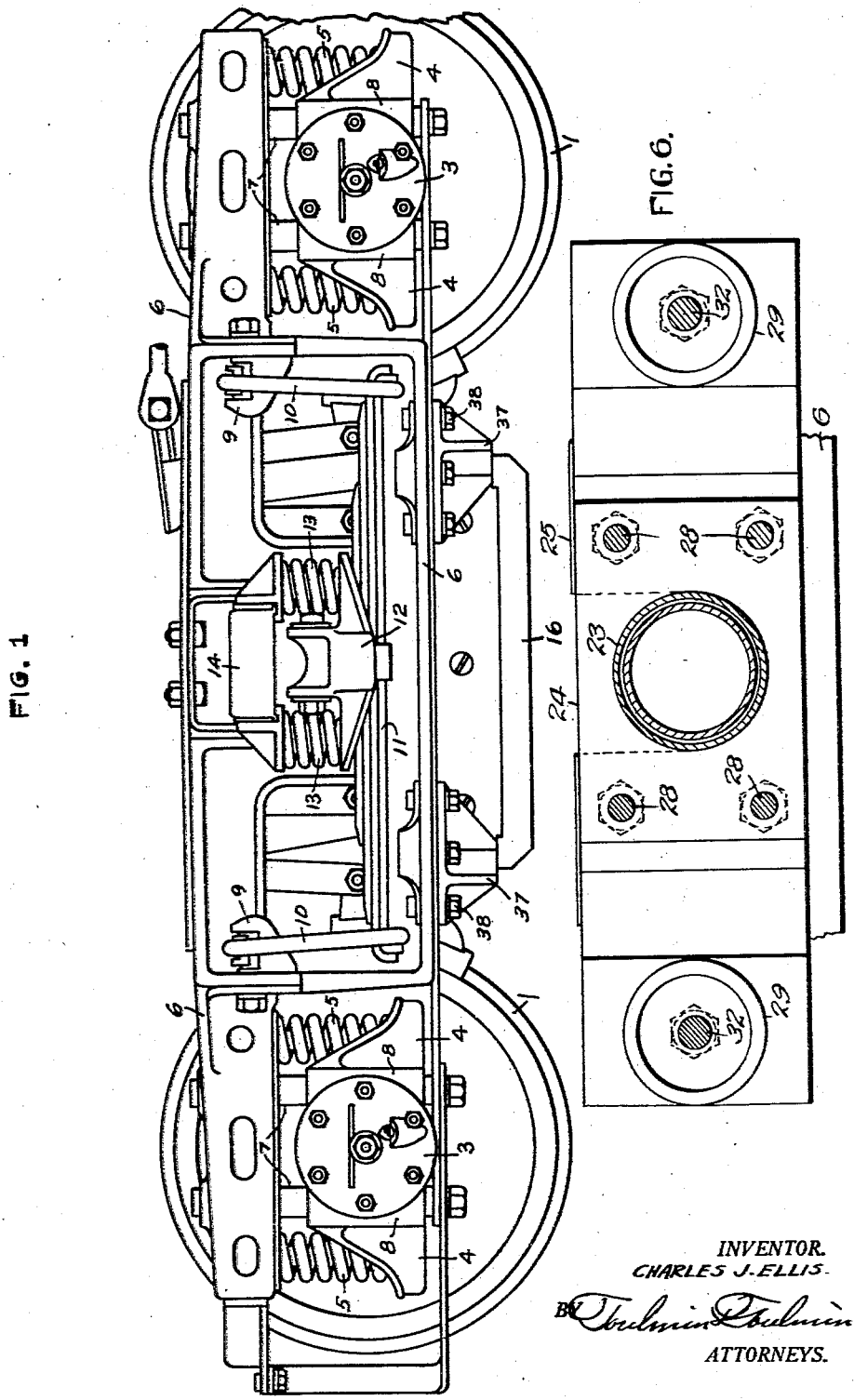

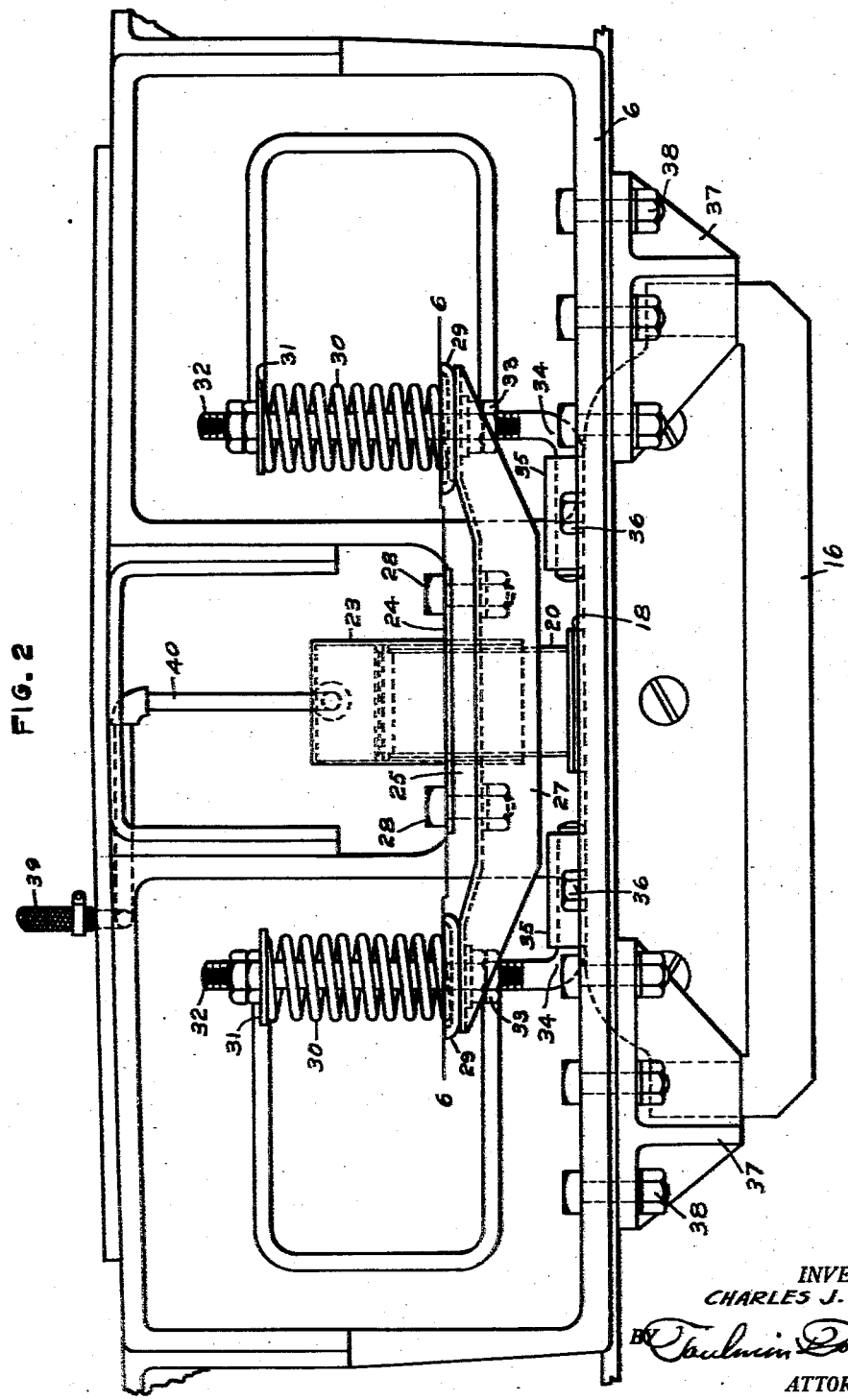

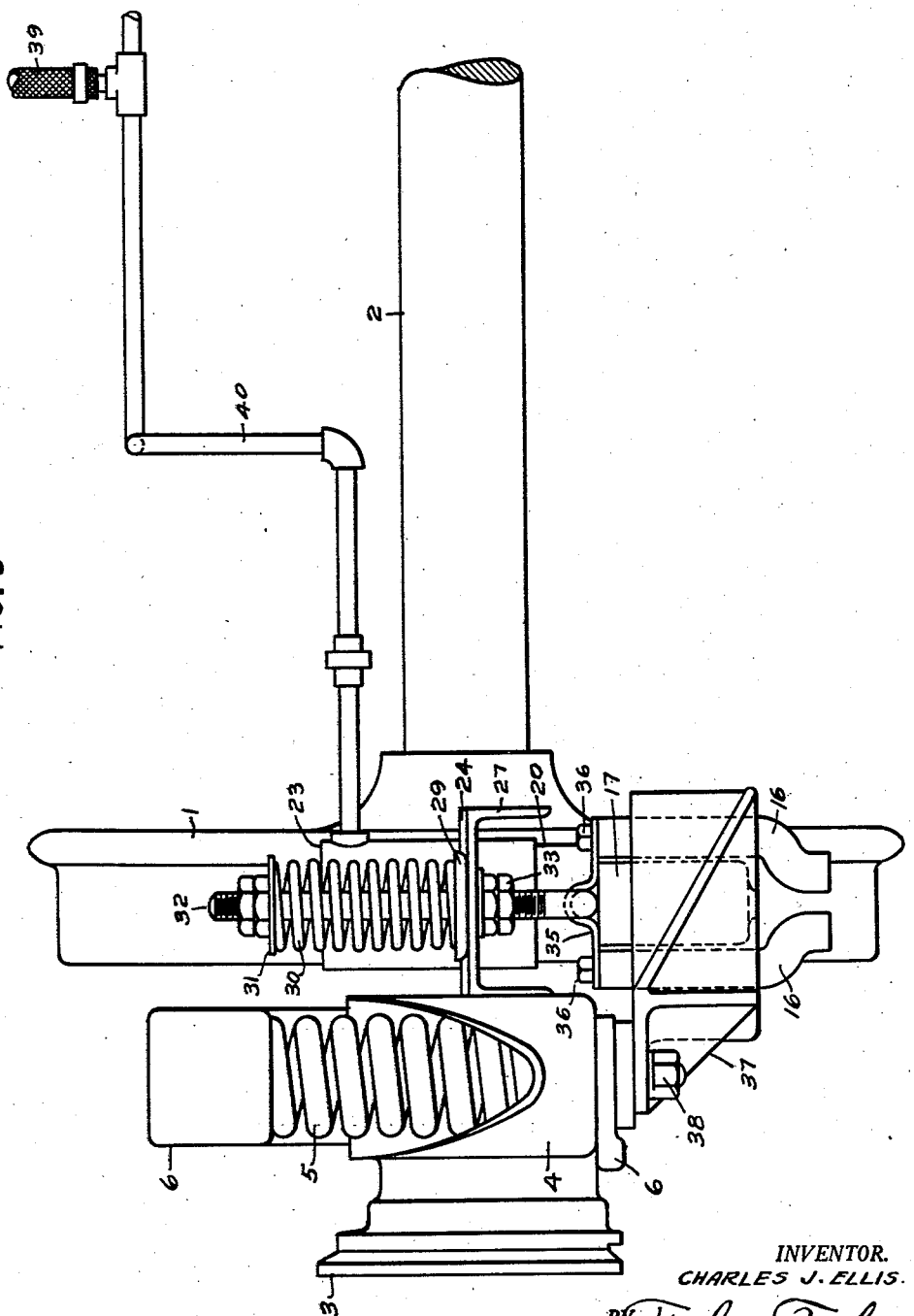

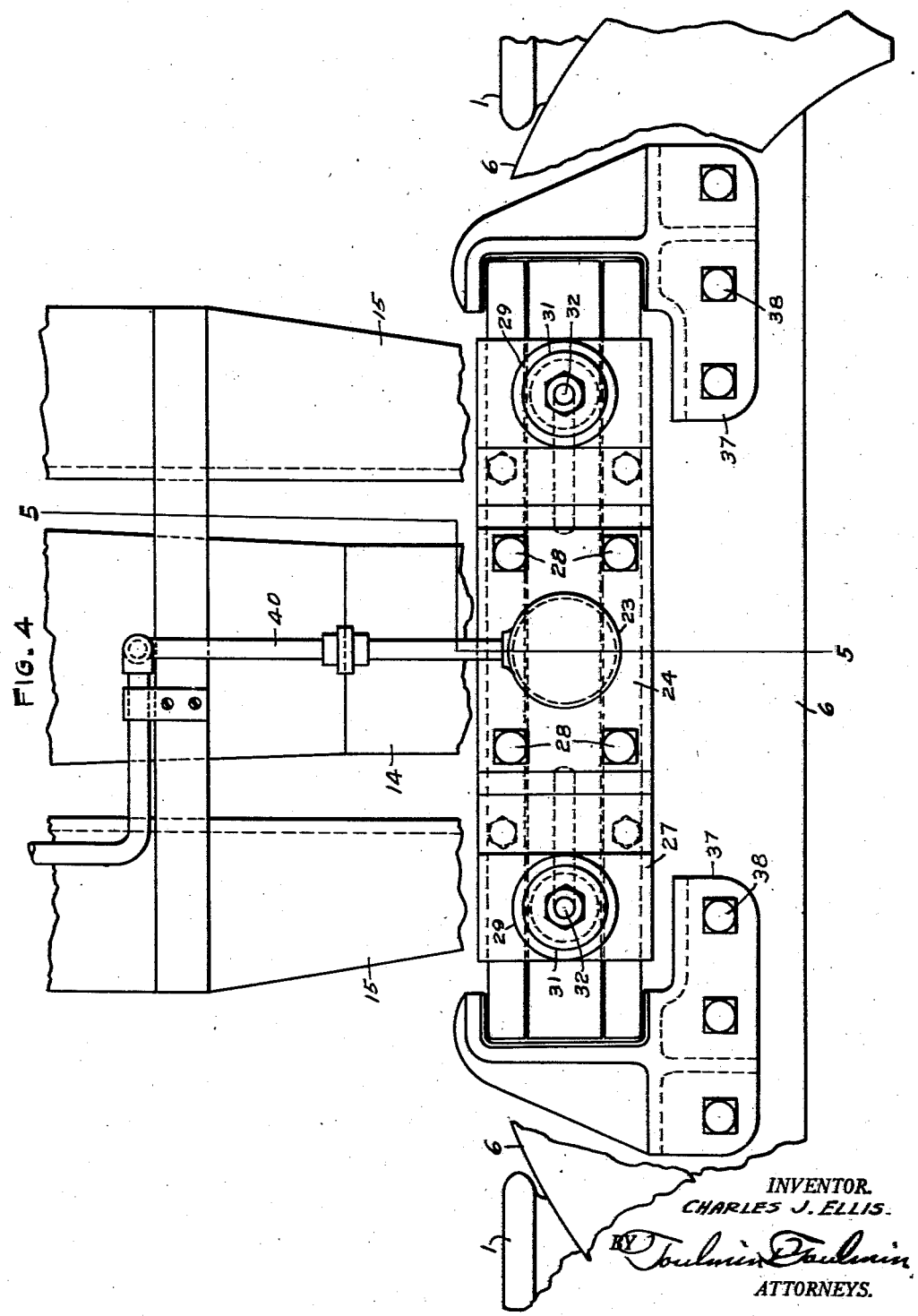

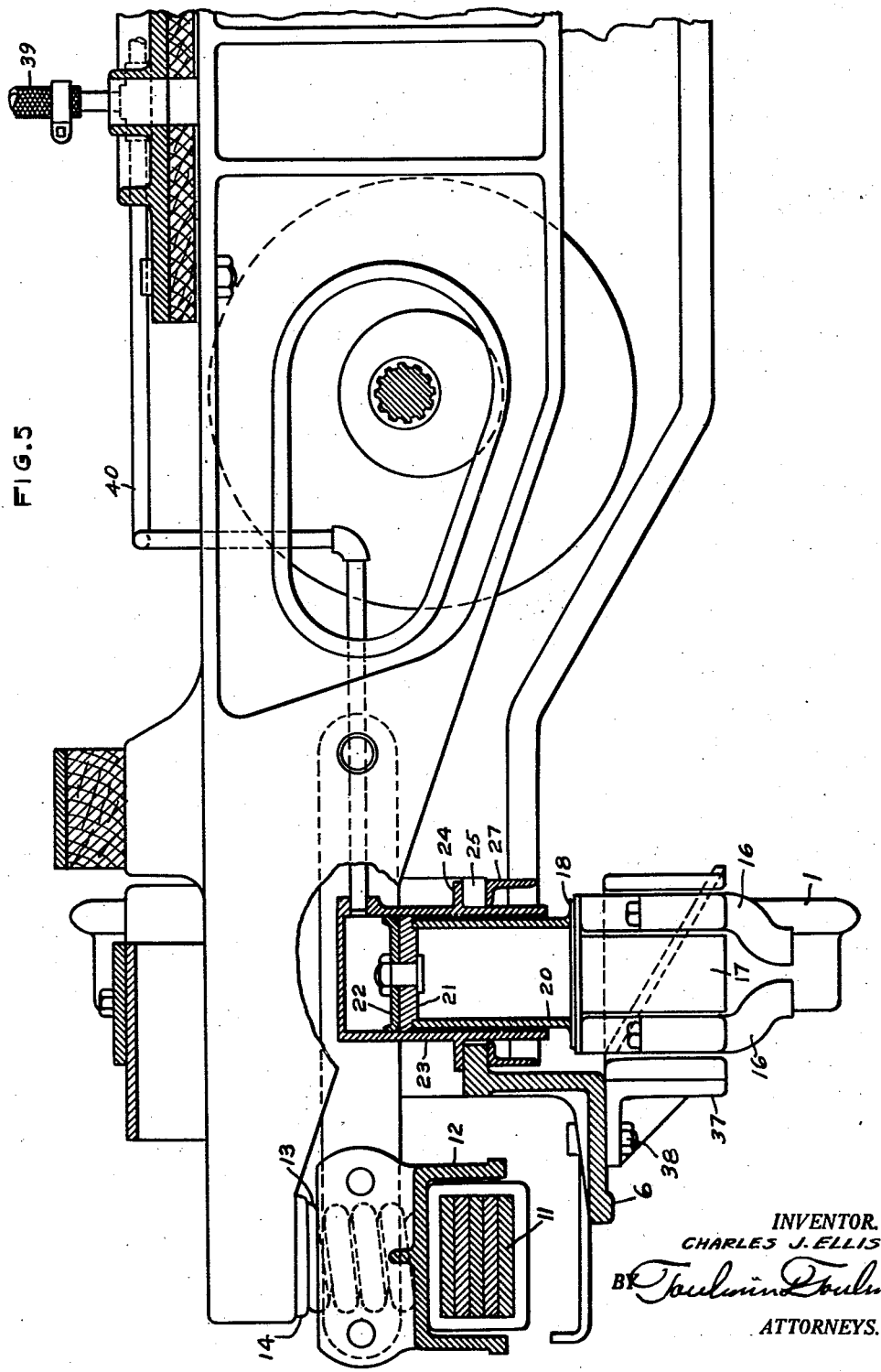

1,866,552

UNITED STATES PATENT OFFICE

CHARLES J. ELLIS, OF CINCINNATI, OHIO, ASSIGNOR TO THE CINCINNATI CAR CORPORATION, OF CINCINNATI, OHIO, A CORPORATION OF OHIO

MAGNETIC BRAKE

Application filed February 14, 1929. Serial No. 339,814.

My invention relates to magnetic brakes.

It is the object of my invention to provide a magnetic brake construction and a car truck for suitably supporting it so arranged that the magnetic brake may be mounted upon the car truck at the bench and be integrally and accurately supported by the truck in alignment with the rails.

It is a further object to provide a novel means of guiding the magnetic brake and of yieldingly supporting it on the truck frame and of aligning the pneumatic cylinder for initially actuating the brake, so that the brake may be installed as an integral structure or detached as a unit, thus facilitating adjustment and repair.

Referring to the drawings:

Figure 1 is an outside elevation of the truck with brake mechanism installed;

Figure 2 is an inside side elevation;

Figure 3 is an end elevation;

Figure 4 is a top plan view;

Figure 5 is a section on the line 5—5 of Figure 4; and

Figure 6 is a section on the line 6—6 of Figure 2.

Referring to the drawings in detail, 1 designates a wheel supported on either end of the axle 2. The axles are journaled in journal boxes 3. The journal boxes are provided with means 4 for supporting helical springs 5 on which rest the side frames 6. Guide members 7 depend from the side frames 6 into the guide sleeves 8 of the journal boxes. The side frame supports on brackets 9 the lateral swinging links 10, the lower ends of which support the extreme outer ends of the leaf springs 11, which are longitudinally arranged parallel to the side frames.

The centers of the leaf springs carry saddles 12 upon which are mounted the helical springs 13 which form a yielding support for the bolster 14 that passes through the side frames from side to side of the truck. The vehicle body is supported from the bolster centrally thereof. The side frames are connected together by the transoms 15 spaced on either side of the bolster.

Referring to the brake mechanism attached to this truck, 16 designates magnetic brake shoes between which there is located the energizing coil 17 adapted to energize the shoes. These shoes and the coil are attached to a supporting plate 18 which forms the bottom of the cylindrical piston 20. Any suitable means may be provided for supplying current to the energizing coil 17 for the purpose of operating the brake shoe. The contact for conducting the current to the coil should be made at the same time and by the same means that operates and controls the admission of air through the tube 39 and pipe 40 into the cylinder. This piston is provided with a piston head or closure 21 carrying the washer 22. The piston operates within the cylinder 23 which has bracket 24 resting upon an inwardly disposed yoke or platform 25. The bolts 28 which attach the brackets or plates 24 to the yoke 25 also serve to attach the spring platform 27 to the side frame yoke 25. These bolts are designated 28.

Thus, the four bolts 28 serve to attach the entire mechanism to the side frames, permitting the brake to be assembled as a unit to the bench and readily and easily attached or detached to the truck.

The spring platform 27 is provided at either end with spring supporting cups 29 which support helical springs 30. These springs support from the tops thereof by plates 31 the bolts 32 which pass through the springs and through the bottoms of the cups. Beneath the cups are nuts 33 adjustably mounted on the bolts 32 which determine the compression of the springs initially. The lower ends of these bolts are turned inwardly as at 34 passing underneath clamps 35 so that the bolts are attached by such clamps and the bolts 36 to the plate 18.

At either end of the brake mechanism are mounted guides 37 which are bolted by the bolts 38 to the lower part of the side frames 6. These guides embrace the sides and ends of the brake mechanism. Air is supplied to the cylinder 23 through the flexible air hose 39 and piping 40 carried on the truck.

*Method of operation*

The magnetic brake operates through the actuation of the air which brings it to initial magnetic position after which the magnetic forces operate drawing the brake into engagement with the rails.

By utilizing the construction in combination with parts as shown in this truck, it is possible to locate the magnetic braking mechanism in the preferred position as a unit without interfering with the operation of the truck. It is so located that the movements of the truck interfere to the minimum with the operation of the brake and its relationship with the rails. The bolster, truck, springs and car body may move, as may be necessary, to accommodate the vehicle to the track without materially disturbing the operation of the brake mechanism and the rails with which it engages.

It will be understood that I desire to comprehend within my invention such modifications as may be necessary to adapt it to varying conditions and uses.

Having thus fully described my invention, what I claim as new and desire to secure by Letters Patent, is:—

1. In combination, a car truck frame, a unitary braking mechanism consisting of an air cylinder, magnetic brake shoes, yielding means for supporting said brake shoes, an air piston working in said cylinder attached to said brake shoe, a common detachable means for attaching said braking mechanism on said truck frame.

2. In combination, a car truck frame, a unitary braking mechanism consisting of an air cylinder, magnetic brake shoes, yielding means for supporting said brake shoes, an air piston working in said cylinder attached to said brake shoe, a common detachable means for supporting said braking mechanism on said truck frame, and means mounted on said truck frame for guiding said magnetic brake mechanism.

3. In combination, a truck having side frames, a bracket integral with each of said side frames adapted to support magnetic braking mechanism, and a unitary magnetic breaking mechanism having a spring supporting bracket, and an air cylinder, and common means for attaching said spring supporting means and air cylinder to said frame bracket.

4. In combination, a car truck having inwardly disposed yokelike brackets, an air cylinder having a flange adapted to be mounted upon said bracket, a magnetic braking mechanism, a piston adapted to operate in said cylinder attached to said braking mechanism, a spring bracket adapted to be attached beneath said yoke on the side frame, springs mounted on said bracket, and means resting on said springs connected to said magnetic brake mechanism.

5. In combination, a car truck having inwardly disposed yokelike brackets, an air cylinder having a flange adapted to be mounted upon said bracket, a magnetic braking mechanism, a piston adapted to operate in said cylinder attached to said braking mechanism, a spring bracket adapted to be attached beneath said yoke on the side frame, springs mounted on said bracket, and means resting on said springs connected to said magnetic brake mechanism, and guides adapted to guide said magnetic brake mechanism, said guides being mounted on said side frames.

6. In combination, a car truck having side frames, a bracketlike yoke mounted on each of said side frames, an air cylinder carried thereby, means of supplying air thereto, an air piston working in said cylinder, said piston and cylinder being mounted between the arms of said yoke, magnetic braking mechanism attached to said air piston, upwardly projecting supporting bolts mounted on said magnetic brake mechanism on either side of said air cylinder, a bracket having longitudinally extending arms mounted beneath said yoke and attached thereto by the same bolts attaching the air cylinder thereto, the ends of said bracket being adapted to receive said supporting bolts for the magnetic brake mechanism, and helical springs carried on the ends of said bracket adapted to support said bolts which pass therethrough.

7. In combination, a car truck having side frames, a bracketlike yoke mounted on each of said side frames, an air cylinder carried thereby, means of supplying air thereto, an air piston working in said cylinder, said positon and cylinder being mounted between the arms of said yoke, magnetic braking mechanism attached to said air piston, upwardly projecting supporting bolts mounted on said magnetic brake mechanism on either side of said air cylinder, a bracket having longitudinally extending arms mounted beneath said yoke and attached thereto by the same bolts attaching the air cylinder thereto, the ends of said bracket being adapted to receive said supporting bolts for the magnetic brake mechanism, and helical springs carried on the ends of said bracket adapted to support said bolts which pass therethrough, and brake guiding means engaging the ends and a portion of the sides of said magnetic brake mechanism adapted to be carried on said side frames.

8. In combination, a car truck, side frames on either side thereof, detachable air cylinders carried on said side frames, detachable spring supporting brackets carried on said side frames, springs mounted on the ends of said brackets, pins passing through said springs and depending therefrom, magnetic braking mechanism supported on the lower ends of said pins, and a piston mounted on said magnetic brake mechanism between said pins adapted to pass into said air cylinder, and means for supplying air to said air cylinder for depressing said braking mechanism and collapsing said springs.

9. In combination in a car truck having side frames, inwardly extending, horizontally disposed yokes forming platforms formed on said side frames, air cylinders projected through said yokes having flanges mounted to the top of said yokes, a longitudinally disposed spring supporting means arranged beneath said yoke on either side and extending beyond the front and to the rear of said yokes and around said air cylinder, an air piston working in said air cylinder through said yoke, magnetic braking mechanism carried by said air piston, yielding means carried on the ends of said spring bracket for supporting said magnetic braking mechanism and said air piston, means to supply air to said cylinder, and guide mechanism carried by said side frames therebeneath adjacent the brake mechanism and the rails on which the truck rides so that the magnetic brakes may be guided into engagement with said rails.

10. In combination in a car truck having side frames, inwardly extending, horizontally disposed yokes forming platforms formed on said side frames, air cylinders projected through said yokes having flanges mounted to the top of said yokes, a longitudinally disposed spring supporting means arranged beneath said yoke on either side and extending beyond the front and to the rear of said yokes and around said air cylinder, an air piston working in said air cylinder through said yoke, magnetic braking mechanism carred by said air piston, yielding means carried on the ends of said spring bracket for supporting said magnetic braking mechanism and said air piston, means to supply air to said air cylinder, and guide mechanism carried by said side frames therebeneath adjacent the brake mechanism and the rails on which the truck rides so that the magnetic brakes may be guided into engagement with said rails, means to yieldingly support a car body on said truck, said means being in turn yieldingly supported on said side frames so arranged that said yieldingly support means may operate on said truck without disturbing said magnetic braking means.

11. In combination, a car truck frame having a platform thereon, a brake mechanism removably attached to said platform, said brake mechanism comprising a bracket, a brake shoe supported by said bracket for vertical movement, and means supported by the platform independent of the bracket to lower the brake shoe.

12. In combination, a car truck frame having a platform thereon, a bracket removably supported by said platform, a brake shoe supported by said bracket for vertical movement and means removably supported by said platform for lowering said shoe.

13. In combination, a car truck frame having a platform thereon, a bracket removably supported by said platform, said bracket having seats thereon, springs in said seats, a brake shoe supported by said springs and means detachably supported by said platform for lowering said brake shoe against said springs.

14. In a magnetic brake, a bracket having a hole in the center thereof, a brake shoe resiliently supported at each end of the bracket, means in said hole to lower the brake shoe, and a common means to which the bracket and the first-named means are attached for supporting them.

15. In a magnetic brake, a bracket having a hole therein, a brake shoe resiliently supported by said bracket, a cylinder in said hole, and a piston in said cylinder attached to said brake shoe for lowering it.

16. In a magnetic brake, a bracket having a hole therein, a brake shoe resiliently supported by said bracket, a cylinder in said hole, a piston in said cylinder attached to said brake shoe for lowering it, and means to which the bracket and cylinder are attached for supporting them.

In testimony whereof, I affix my signature.
CHARLES J. ELLIS.